United States Patent
Al-Aqeeli et al.

(10) Patent No.: US 9,382,160 B2
(45) Date of Patent: Jul. 5, 2016

(54) WASTE CRUMB-RUBBER AUGMENTED MASONRY BLOCKS

(71) Applicant: King Fahd University of Petroleum and Minerals, Dhahran (SA)

(72) Inventors: Nasser M. Al-Aqeeli, Dhahran (SA); Homoud M. Assehdi, Al-Khobar (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 143 days.

(21) Appl. No.: 14/253,978

(22) Filed: Apr. 16, 2014

(65) Prior Publication Data
US 2015/0299043 A1  Oct. 22, 2015

(51) Int. Cl.
*C04B 26/00* (2006.01)
*C04B 26/02* (2006.01)
*C04B 28/02* (2006.01)
*C04B 111/10* (2006.01)

(52) U.S. Cl.
CPC ......... *C04B 28/02* (2013.01); *C04B 2111/1056* (2013.01); *Y02W 30/96* (2015.05)

(58) Field of Classification Search
CPC ...... C04B 26/02; C04B 26/006; C04B 18/22; C04B 24/42; C04B 28/02
See application file for complete search history.

(56) References Cited

U.S. PATENT DOCUMENTS

| 5,391,226 A | * | 2/1995 | Frankowski | ............ C04B 18/22 106/696 |
| 2005/0182160 A1 | | 8/2005 | Milani Nejad et al. | |
| 2010/0258751 A1 | * | 10/2010 | Shayer | .................... C04B 28/02 250/506.1 |
| 2014/0042668 A1 | * | 2/2014 | Bennett | ................. B29C 39/003 264/334 |

FOREIGN PATENT DOCUMENTS

EP  0739319 B1  7/2001

* cited by examiner

*Primary Examiner* — Alexa Neckel
*Assistant Examiner* — Marie Reddick
(74) *Attorney, Agent, or Firm* — Oblon, McClelland, Maier & Neustadt, L.L.P.

(57) ABSTRACT

This invention relates to the development of Crumb Rubber augmented masonry blocks. Crumb rubber is extracted from scrape tires after being processed and then mixed in specified percentages with concrete, cement and water. In the present disclosure sand, which is used in the formation of conventional blocks, is replaced with crumb rubber to produce a sand-free masonry block containing crumb rubber. The developed crumb rubber masonry blocks satisfied the ASTM non-load bearing requirements in addition to satisfying the water absorption test.

16 Claims, 2 Drawing Sheets

WASTE CRUMB-RUBBER AUGMENTED MASONRY BLOCKS

BACKGROUND OF THE INVENTION

1. Technical Field

The present invention relates to a masonry block in which crumb rubber material replaces sand in a masonry block comprising of a homogeneously dispersed cement, concrete, crumb rubber and water.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A search for innovative, environmentally friendly and ready-to-use building composites that combine higher efficiency and quality in the building process with improved thermal resistance has been ongoing. This has set increased demands on the both thermal and mechanical (thermo-mechanical) performances of new building products integrated with various plasters, foils, particles and rubbers. The large demand on building material industry has resulted from the increasing population, leading to a chronic shortage of building materials. The engineers have then been challenged to convert the industrial wastes to useful building and construction materials. Accumulation of unmanaged wastes is one of today's significant environmental concerns, especially in developing countries. Recycling of such wastes as building materials appears to be a viable solution not only to such pollution problem but also to the problem of the economical design of buildings. The increase in the popularity of using environmentally friendly, low cost and lightweight construction materials in building industry brings the need for searching more innovative, flexible and versatile composites. The most important aspects of innovation might be in the development of integrated insulation products such as the insulated, reinforced concretes, two or three-wythe precast sandwich wall panels, and rubberized concretes. Part of this interest is to establish the thermal performance of the alternative systems and products. Accurate thermal characteristics are required to guide product development and manufacturing. Methods and data exist for dealing with the common building walls and insulations, but new systems and products are generally lacking such data.

One of the new and popular products in this sense is modified cementitious composites with scrap tire rubber. Use of rubber from scrap tires in cement concrete mixtures can result in large benefits, like lower density, increased toughness and ductility, higher impact resistance, and more efficient heat and sound insulation. The use of recycled tire rubber also helps alleviate disposal problems and address the growing public concern about the need to preserve natural sand and aggregates.

Accumulations of discarded waste tires have been a major concern because of waste rubber is not easily biodegradable even after a long-period. Landfill treatment and unmanaged waste tires represent an environmental and health risk through fire hazard and as a breeding ground for disease-carrying mosquitoes. The alternatives are thus oriented toward materials and energy recovery.

A brick is the most basic building material for construction of low cost houses and apartments. Conventional types of brick are made from burnt clay and a significant quantity of fuel is consumed during its production.

Crumb rubber is produced by stepwise grinding of used tires. The crumb rubber can be used in different industries such as rubberized asphalt, mats production, and play ground athletic fields. Production of crumb rubber composites will open up a new market for crumb rubber.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

One embodiment of the disclosure relates to a masonry block that includes a mixture of crumb rubber, concrete, water, and cement.

In another embodiment the mixture is a homogeneously dispersed mixture of cement, concrete, water, and crumb rubber.

In another embodiment the cement comprises 20-30% of the mixture.

In another embodiment the concrete comprises 50-60% of the mixture.

In another embodiment the water comprises 5% of the mixture.

In another embodiment the crumb rubber comprises 10-20% of the mixture.

In another embodiment the cement comprises 25% of the mixture.

In another embodiment the concrete comprises 55% of the mixture.

In another embodiment the crumb rubber comprises 15% of the mixture.

In another embodiment the masonry block is a sand-free mixture.

In another embodiment no aggregate material is added to the mixture comprising crumb rubber, concrete, cement, and water.

In another embodiment the only aggregate material present in the masonry block is the crumb rubber.

In another embodiment the mesh size of the crumb rubber is 75-85 mesh.

In another embodiment the masonry block weighs 16.0-16.5 kg.

In another embodiment the masonry block has a water absorption of 6.20-6.30%.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
FIG. 1 illustrates a conventional masonry block.

Referring now to the drawings, wherein like reference numerals designate identical or corresponding parts throughout the several views.

One embodiment of the disclosure describes Crumb Rubber (CR) augmented Masonry Blocks. In one embodiment, crumb rubber is obtained from scrap tires after being processed. The crumb rubber is then mixed in specified percentages with concrete particles, cement and water. The conventional processing of Masonry blocks includes mixing concrete, cement water and 15% of sand. The sand is typically about 10-20% of the masonry block. Preferably, about 15% of the conventional masonry block is sand. Sand is a naturally occurring granular material composed of finely divided rock and mineral particles. The composition of sand may vary depending on the local rock sources and conditions, but the most common constituent of sand in inland settings includes $SiO_2$ in the form of quartz. Sand is in particulate form, e.g., grains having a diameter of from 0.0625 mm or less to about 2 mm.

In one embodiment $SiO_2$ may be present in cement. Cement may include $SiO_2$-containing materials including but not limited to belite ($2CaO.SiO_2$), alite ($3CaO.SiO_2$), celite ($3CaO.Al_2O_3$), or brownmillerite ($4CaO.Al_2O_3.Fe_2O_3$) commonly found in sand-free cement.

In one embodiment the masonry blocks are made by mixing cement with crumb rubber in the absence of sand. In another embodiment the masonry blocks are made with cement containing sand and mixing the cement with crumb rubber. Preferably no sand is present in the masonry block.

In one embodiment of the present disclosure, sand is replaced with crumb rubber. Crumb rubber is usually retrieved from recycled tires that are ground to about the size of a lump of coal. Thereafter these nuggets are ground down to about walnut size, with further grinding techniques bringing the walnut size bits of rubber down to mesh sizes to a lower mesh size. Preferably crumb rubber has an 80 mesh size.

In one embodiment, the crumb rubber particles of the present disclosure are treated with a surface treatment agent such as hydrogen peroxide to form treated particles having more carboxylic sites than untreated particles. The functional groups in the mixture containing water, concrete, and cement then interact with the carboxylic sites, thereby causing the treated crumb rubber particles to contact with and be suspended in the mixture to a much greater degree than untreated particles.

Preferably, the crumb rubber particles are as small as possible so that they are most easily suspended in the mixture. The particles can be treated by mixing them with hydrogen peroxide at a temperature of about 65-85 degrees Centigrade while stirring for about 20 to 30 minutes to produce a freely-flowing powder. Preferably, the amount of hydrogen peroxide used is 0.035-0.040 milli-moles of peroxide per gram of mixture.

In another embodiment of the disclosure, the crumb rubber may also be compressed at high pressure at the presence of a specialized urethane, sodium silicate or any other acceptable glues. Preferably, the crumb rubber is compressed at a high pressure in the presence of a sodium silicate. In one embodiment, the applied pressure is stepped until the crumb rubber is flowable by first applying 1600 PSI and then in 15 second intervals stepping up the pressure by 500 PSI until the pressure reaches 3600 PSI.

In another embodiment the crumb rubber can be treated with a silanizing agent including but not limited to aminosilanes, glycidoxysilanes, and mercaptosilanes. Such aminosilanes include but are not limited to (3-aminopropyl)-diethoxy-methylsilane, (3-aminopropyl)-dimethyl-ethoxysilane, and (3-aminopropyl)-trimethoxysilane. Such glycidoxysilanes include but are not limited to (3-glycidoxypropyl)-dimethyl-ethoxysilane. Such mercaptosilanes include but are not limited to (3-mercaptopropyl)-trimethoxysilane and (3-mercaptopropyl)-methyl-dimethoxysilane. The organofunctional alkoxysilane group of the silanizing agent interacts with the hydroxyl group of the crumb rubber to displace the alkoxy groups attached to the silane molecule. A crumb rubber matrix containing the silanized crumb rubber is formed.

One embodiment includes a masonry block comprising crumb rubber, concrete, cement, and water. In one embodiment, crumb rubber, cement, and concrete are placed in a concrete mixer and dry mixed for a time period in the range of 30 seconds-10 minutes, 45 seconds-8 minutes, or 50 seconds-5 minutes. Preferably the crumb rubber, cement, and concrete are dry mixed for 1 minute. Mixing the crumb rubber, cement, and concrete forms a mixture in which the crumb rubber is homogenously dispersed. Following the dry mixing process, water is added to the mixture of crumb rubber, cement, and concrete. The water is slowly poured into a mixer while the mixer turns the cement, crumb rubber, and concrete for a time period in the range of 1-10 minutes, 2-8 minutes, or 3-6 minutes. Preferably the water is mixed into the mixture for a time period of 3 minutes.

The mixture of water, crumb rubber, cement, and concrete is fed into a steel mould to create a masonry block shape. The fresh mix is compacted in the mould by using a steel rod. After setting into the mould, the mixture is air cured for a time period in the range of 1-10 hours, 2-8 hours, or 4-7 hours. Preferably the mixture is air cured in the mould for a time period of 6 hours and then removed from the mould, which results in a masonry block. The masonry block is then cured for a time period of 15-30 days in a cure tank filled with lime-saturated water at a temperature in the range of 20-30° C., 21-29° C. or 22-28° C. Preferably the masonry block sample is cured for a time period of 28 days in a cure tank filled with lime-saturated water at a temperature of 22° C.

The crumb rubber used has a mesh size of 65-100 mesh, 70-100 mesh, 75-95 mesh, or 80-90 mesh. Preferably, the mesh size of the crumb rubber is 80 mesh. In one embodiment, the crumb rubber is a thermoset or thermoplastic polymer in the form of recycled crumb rubber from automotive and truck scrap tires.

A comparative analysis was carried out between conventional masonry blocks and those augmented with CR. The developed CR-blocks displayed a combination of properties that satisfied the ASTM non-load bearing requirements in addition to satisfying the water absorption test.

The current commercially available masonry blocks are composed of concrete, cement, water and sand and they are being utilized heavily in the construction industry. In one embodiment, sand is replaced with crumb rubber using the same processing route. The crumb-rubber augmented masonry block was evaluated for the performance of the Masonry blocks in conditions similar to the ones faced during their utilization in the construction industry. The conventional masonry blocks are composed of the following ingredients with the listed percentages as listed in Table 1:

TABLE 1

Percent Composition of Conventional Masonry Blocks

| Ingredient | Percentage |
|---|---|
| Cement | 25% |
| Concrete | 55% |
| Water | 5% |
| Sand | 15% |

FIG. 1 depicts conventional masonry blocks which have an average weight of 18.7 kg.

The CR-augmented Masonry blocks are composed of the following ingredients including but not limited to cement, concrete, water, and crumb rubber. The crumb rubber augmented masonry blocks may include percent compositions in the range of 20-40% cement, 40-60% concrete, 5-15% water, and 5-25% crumb rubber. Preferably, the crumb rubber augmented masonry block may include percent compositions including but not limited to 25% cement, 55% concrete, 5% water, and 15% crumb rubber, or 30% cement, 55% concrete, 5% water, and 10% crumb rubber, or 25% cement, 40% concrete, 10% water, and 25% crumb rubber, or 25% cement, 50% concrete, 10% water, and 15% crumb rubber. More preferably, the percent composition of the crumb rubber augmented masonry block is 25% cement, 55% concrete, 5% water, and 15% crumb rubber.

In another embodiment, the crumb rubber augmented masonry block is sand free and no aggregate material is added to the mixture comprising cement, concrete, crumb rubber, and water.

In another embodiment the only aggregate material present in the masonry block is the crumb rubber. Preferably there is no other aggregate present in the matrix block having an average particle size of 0.1-10 times, 0.5-5 times, or 0.8-1.2 times the average particle size of the crumb rubber. More preferably there is no other aggregate present in the matrix block having an average particle size of 0.5-5 times the average particle size of the crumb rubber. The average particle size may be the $D_{50}$ weight average particle size.

Table 2 displays an example of a percent composition of a crumb-rubber augmented masonry block.

TABLE 2

Percent Composition of Crumb-Rubber Augmented Masonry Blocks

| Ingredient | Percentage |
|---|---|
| Cement | 25% |
| Concrete | 55% |
| Water | 5% |
| Crumb Rubber (mesh size-80 mesh) | 15% |

In another embodiment of the invention, the crumb rubber must consist of at least 10% of the percent composition of the crumb rubber augmented masonry block.

The weight of the crumb rubber augmented masonry block is in the range of 10-30 kg, 11-20 kg, or 12-18 kg. Preferably, the crumb rubber augmented masonry block weighs on average 16.2 kg.

Figure 2:
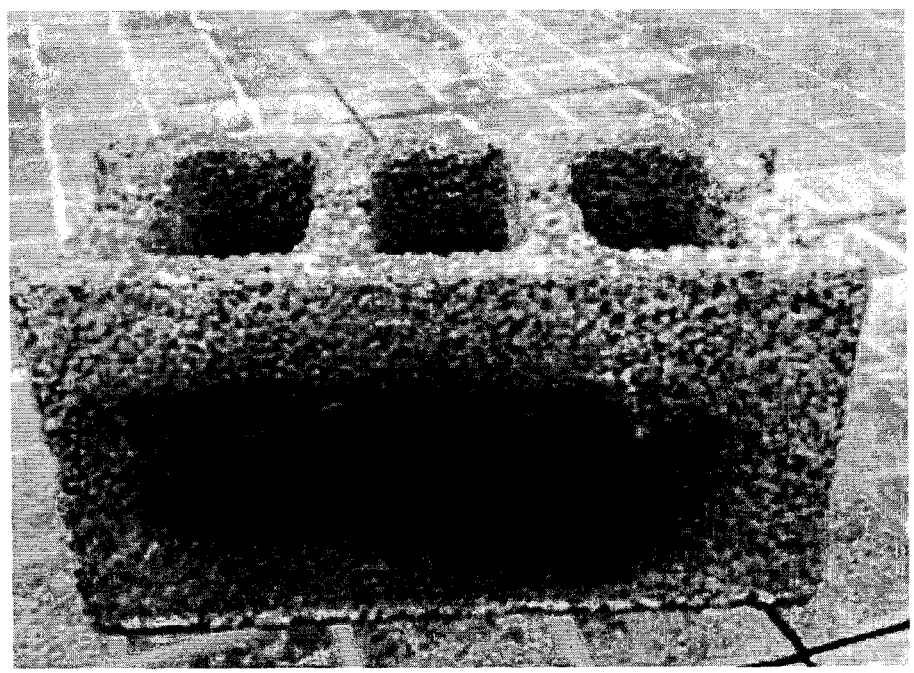
FIG. 2 illustrates a crumb-rubber augmented masonry block.

FIG. 2 displays the block fabricated with CR-augmentation which weighs on average 16.2 kg.

Multiple tests were performed on the crumb rubber augmented masonry blocks in order to assess any improvement in their characteristics. Compressive tests (both load bearing and non-load bearing) were performed in addition to water absorption for both conventional and CR-augmented blocks. Four specimens from CR-augmented blocks and 2 specimens of conventional blocks were used. SEM images of the blocks were also obtained to study the morphology and elemental composition of the tested blocks. The results of the tested blocks are provided below.

Compressive Strength

Non-Load Bearing Test

| Mix # | Specimen # | Net area, mm² | Load, kN | Compressive strength, MPa | Average compressive strength MPa | Requirement as per ASTM C129 (Non-Load Bearing Blocks) |
|---|---|---|---|---|---|---|
| Conventional Block | 1 | 45697 | 727.7 | 15.92 | 15.92 | 4.14 MPa |
| CR-augmented Block | 1 | 46990 | 218.2 | 4.64 | 4.74 | |
|  | 2 | 47508 | 229.3 | 4.83 | | |

Load Bearing Test

| Mix # | Specimen # | Gross area, mm² | Load, kN | Compressive strength, MPa | Average compressive Strength Mpa | Requirement as per ASTM C90 (Load Bearing Blocks) |
|---|---|---|---|---|---|---|
| Conventional Block | 1 | 81539 | 727.7 | 8.92 | 8.92 | 6.9 MPa |
| CR-augmented Block | 1 | 81470 | 218.2 | 2.68 | 2.74 | |
|  | 2 | 81736 | 229.3 | 2.81 | | |

Conventional masonry blocks satisfy the requirements of both load-bearing and non-load-bearing blocks, as the blocks need to display an average compressive strength of at least 4.14 MPa. The conventional blocks have an average compressive strength of 15.92 MPa, while the crumb rubber augmented masonry blocks have an average compressive strength of 4.74 MPa. For the non-load bearing test, the crumb rubber augmented masonry blocks were exposed to two different specimens, specimen #1 and specimen #2. For specimen #1, the CR augmented masonry block has a compressive strength of 4.64 MPa. For specimen #2, the CR augmented masonry block has a compressive strength of 4.83 MPa. The crumb rubber augmented masonry blocks meet the requirement to pass the non-load bearing test.

For the load bearing test, the blocks must have an average compressive strength of at least 6.9 MPa to satisfy the requirements to pass the load bearing test. The conventional blocks have an average compressive strength of 8.92 MPa, while the crumb rubber augmented masonry blocks have an average compressive strength of 2.74. For the load bearing test, the crumb rubber augmented masonry blocks were exposed to two different specimens, specimen #1 and specimen #2. For specimen #1, the CR augmented masonry block has a compressive strength of 2.68 MPa. For specimen #2, the CR augmented masonry block has a compressive strength of 2.81 MPa. The crumb rubber augmented masonry block does not meet the requirement to pass the load bearing test. CR-augmented masonry blocks meet only the requirement for non-load bearing blocks which is the required test for the utilization of these blocks in construction industry.

| | | Water Absorption | | | |
|---|---|---|---|---|---|
| | | Water absorption was determined as per ASTM C 642. | | | |
| Mix # | Specimen # | Dry weight, g | Sat surface dry weight, g | Water absorption, % | Average water absorption, % |
| Conventional Block | 2 | 18751.50 | 19646.80 | 4.77 | 4.77 |
| CR-augmented Block | 3 | 16255.30 | 17268.80 | 6.23 | 6.24 |
| | 4 | 16433.20 | 17460.40 | 6.25 | |

Water absorption of both the blocks is within the acceptable limit. The acceptable limit of water adsorption for the water adsorption test is less than 10% water adsorption under standard working conditions and a standard environment. The conventional masonry blocks, with a saturated dry surface weight of 19646.80 g, absorb 4.77% water when exposed to specimen #2. The crumb rubber augmented masonry blocks were exposed to specimen #3 and specimen #4. The CR augmented masonry block, when exposed to specimen #3 has a saturated dry surface weight of 17268.80 g and absorbs 6.23% water. The CR augmented masonry block, when exposed to specimen #4 has a saturated dry surface weight of 17460.40 g and absorbs 6.25% water. The average water absorption for the CR augmented masonry blocks is 6.24%. The CR augmented masonry blocks have a higher water absorption capacity than the conventional masonry blocks.

The following Scanning Electron Microscope (SEM) was also used to reveal the morphology of the developed blocks and it can be seen that there is no significant fluctuation in morphology or possible inhomogeneity in both blocks. Preferably the masonry block has a homogeneous distribution of particles with respect to one or more properties including but not limited to particle diameter, surface morphology, or composition.

Figure 3:
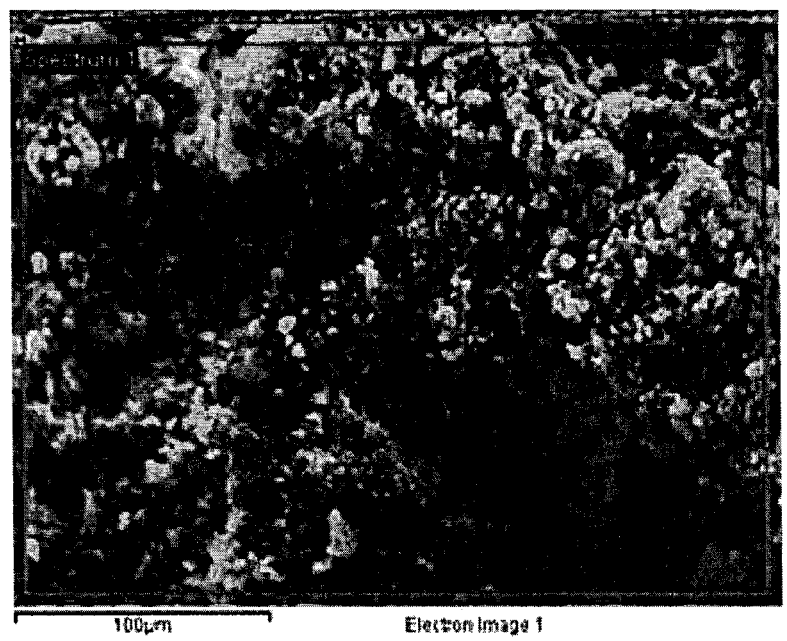
FIG. 3 illustrates the morphology of conventional masonry blocks.

FIG. 3 is an electron image that depicts the morphology of conventional masonry blocks.

Figure 4:
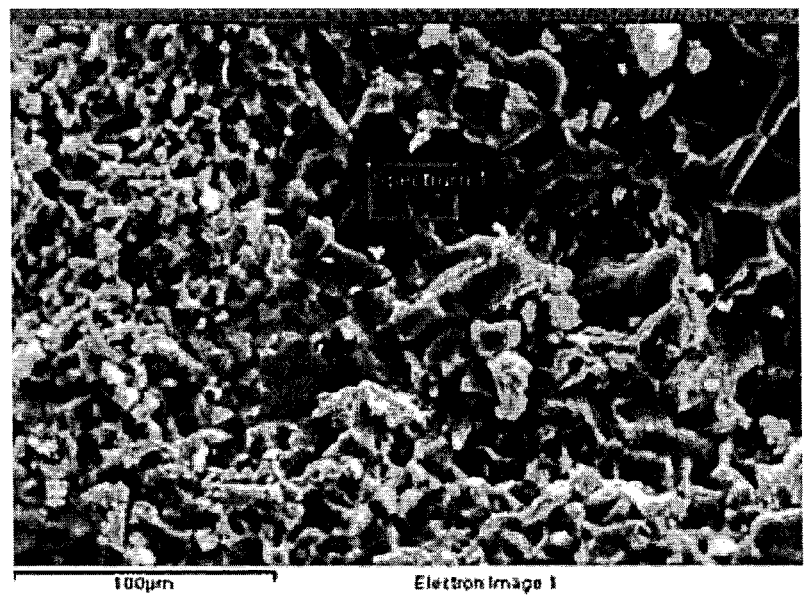
FIG. 4 illustrates the morphology of crumb-rubber augmented blocks.

FIG. 4 is an electron image that depicts the morphology of crumb rubber augmented masonry blocks.

In another embodiment the CR augmented masonry blocks don't require new processing routes as the same route used for producing conventional blocks can be adopted.

In another embodiment the CR augmented masonry blocks satisfy the standard for utilization in construction industry.

In another embodiment the CR augmented masonry blocks contribute significantly in utilizing Crumb rubber which will be a motivation to stop burning car tires and start shredding them to obtain more CR for the utilization in such application.

It has been observed that there is a physiological barrier in the public to use products that are made out of CR (or waste tires, as they refer to it). This has hindered the utilization of CR in important applications such as flooring and play grounds. The present embodiment utilizes CR in products and applications that are not in direct contact with people in order to remove this limitation.

The scraped tires cannot be considered a waste material since it contains the needed Crumb Rubber that could be utilized. It is a valuable product with ongoing expansion and growth in diversified markets. It is far better to remove tires from the waste stream, regardless of disposal method, than to allow the continuation of uncontrollable and disastrous waste tire stock fires throughout the world. The extracted materials can be used as well once CRs is being removed from the tires. The CR-augmented Masonry blocks described in the disclosure were able to pass the ASTM standards adopted for the utilization of Masonry blocks in non-loading applications in addition to water absorption.

Utilizing and recycling crumb rubber in industry will have a tremendous environmental impact since scrap tires are typically burned due to the lack of suitable utilization of the crumb rubber that is extracted from them.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A sand-free masonry block, consisting of:
   a homogeneously dispersed mixture of cement, water, and crumb rubber.

2. The masonry block of claim 1 wherein the mesh size of the crumb rubber is 65-100 mesh.

3. The masonry block of claim 1 wherein the masonry block weighs 16.0-16.5 kg.

4. The masonry block of claim 1 wherein the masonry block has a water absorption of 6.20-6.30%.

5. The masonry block of claim 1, wherein the crumb rubber is silanized crumb rubber obtained by treating crumb rubber with a silanizing agent selected from the group consisting of an aminosilane, a glycidoxysilane, and a mercaptosilane.

6. The masonry block of claim 5, wherein the aminosilane is selected from the group consisting of (3-aminopropyl)- diethoxy-methylsilane, (3-aminopropyl)-dimethyl-ethoxysilane, and (3-aminopropyl)-trimethoxysilane.

7. The masonry block of claim 5, wherein the glycidoxysilane is (3-glycidoxypropyl)-dimethyl-ethoxysilane.

8. The masonry block of claim 5, wherein the mercaptosilane is (3-mercaptopropyl)-trimethoxysilane or (3-mercaptopropyl)-methyl-dimethoxysilane.

9. The masonry block of claim 1, which has a wt. % of cement ranging from 20 to 40%, relative to the total weight of the masonry block.

10. The masonry block of claim 1, which has a wt. % of water ranging from 1 to 15%, relative to the total weight of the masonry block.

11. The masonry block of claim 1, which has a wt. % of crumb rubber ranging from 5 to 25%, relative to the total weight of the masonry block.

12. The masonry block of claim 1, which has a wt. % of crumb rubber ranging from 15 to 25%, relative to the total weight of the masonry block.

13. The masonry block of claim 1, which has a wt. % of crumb rubber ranging from 12 to 18%, relative to the total weight of the masonry block.

14. The masonry block of claim 1, which has a wt. % of crumb rubber ranging from 5 to 15%, relative to the total weight of the masonry block.

15. The masonry block of claim 1, which has a wt. % of crumb rubber ranging from 5 to 10%, relative to the total weight of the masonry block.

16. A sand-free masonry block, comprising:
a homogeneously dispersed mixture of cement, water, and crumb rubber,
wherein the crumb rubber is silanized crumb rubber obtained by treating crumb rubber with a silanizing agent selected from the group consisting of an aminosilane, a glycidoxysilane, and a mercaptosilane, and
wherein the silanized crumb rubber is the only aggregate material present.

* * * * *